July 28, 1959 — K. W. MILLER — 2,896,937
VIBRATION ISOLATOR WITH VARIABLE DAMPING
Filed Sept. 13, 1957
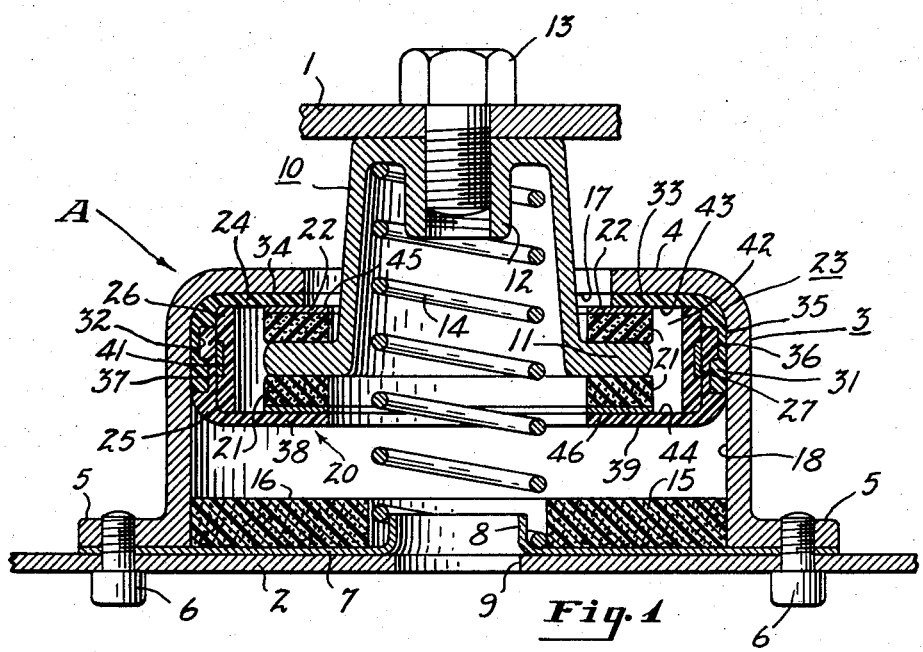
Fig. 1
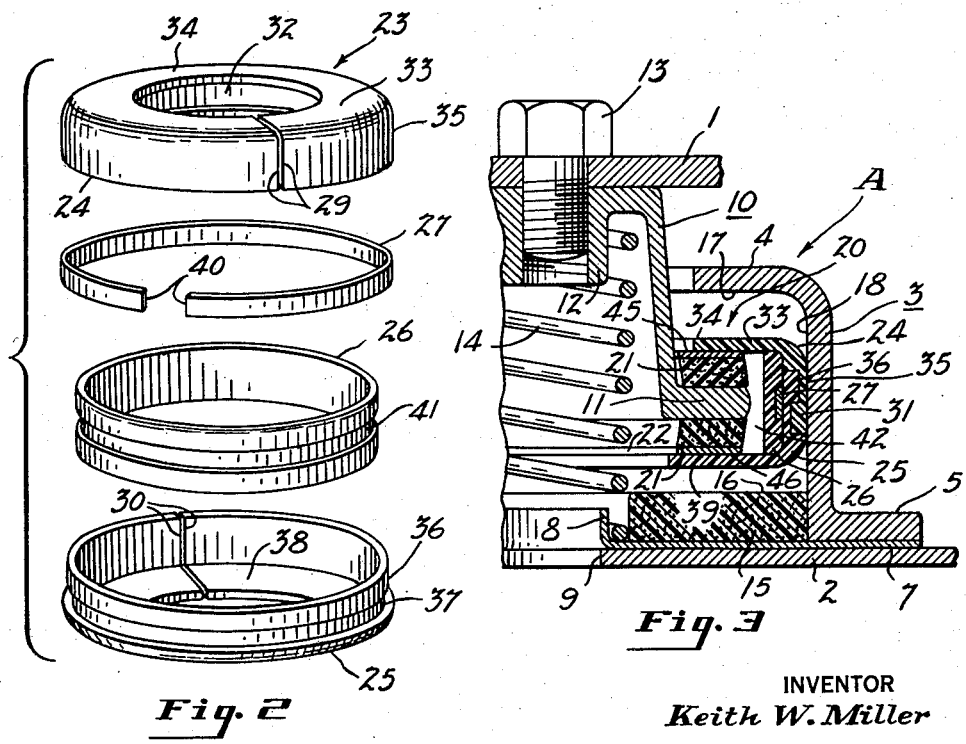
Fig. 2
Fig. 3
INVENTOR
Keith W. Miller
BY McCoy, Greene & TeGrotenhuis
ATTORNEYS United States Patent Office 2,896,937
Patented July 28, 1959

2,896,937

VIBRATION ISOLATOR WITH VARIABLE DAMPING

Keith W. Miller, Logansport, Ind., assignor to The General Tire & Rubber Company, a corporation of Ohio Application September 13, 1957, Serial No. 683,831

7 Claims. (Cl. 267—1)

The present invention relates to a vibration and shock mount and more particularly to a cup-type vibration isolator which has the ability to provide extremely slight damping forces in any direction during minor vibrations and has the ability to provide large damping forces during severe vibrations.

According to the present invention, a vibration and shock mount is provided having an internally cylindrical housing, a rigid core extending into the housing, and a piston-like damping ring yieldably carried by the core and slidably engaging the internal cylindrical surface of the housing. The damping ring is mounted on the core by sponge rubber elements which are arranged to permit slight horizontal and vertical movement of the damping ring relative to the core and to provide extremely light damping forces in any direction. The sponge rubber dampers are very efficient over a wide temperature range (from —65° F. to +200° F.) and deflate in a nonlinear manner under an applied force so that the transition from slight to large damping force is gradual rather than abrupt.

The sponge rubber permits slight axial vibration of the core relative to the housing without moving the piston-like damping ring. However, when the exciting forces become large, sufficient force is transmitted from the core to the damping ring to slide the damping ring axially within the housing. The damping ring preferably is made of plastic so that the friction between the damping ring and the housing provides large damping forces which prevent excessive vibration.

It is preferable to provide a sliding connection between the sponge rubber elements and the piston-like damping ring so that friction generated by horizontal vibration of the core relative to the housing damps large vibrations which cannot be taken up solely by the sponge rubber.

The vibration isolator of the present invention preferably includes resilient snubbing members of sponge rubber or other suitable elastomer to cushion the piston-like ring when it reaches the end of its stroke. The assembly also may include a resilient snubbing ring for cushioning horizontal movement of the core and an expansible ring for expanding the damper ring radially outwardly against the housing.

It is an object of the present invention to provide a simple inexpensive vibration mount which cushions vibrations of small amplitude in any direction and effectively cushions vibrations of large amplitude in both horizontal and vertical directions.

A further object of the present invention is to provide a vibration isolator which will operate at both high and low temperatures and which has a long useful life.

Other objects, uses and advantages of the present invention will become apparent to those skilled in the art from the following description and claims and from the drawings, in which:

Figure 1 is a vertical sectional view of a vibration isolator constructed according to the present invention, the parts being shown in their normal positions;

Figure 2 is an exploded view showing the parts which make up the damping ring of the vibration isolator of Fig. 1; and Figure 3 is a fragmentary vertical sectional view similar to Fig. 1 showing the parts of the isolator in their positions at one instant during a severe vibration.

Referring more particularly to the drawings which are drawn to scale and in which like parts are identified by the same numerals throughout the several views, Figs. 1 and 3 show a vibration isolator A mounted between metal plates 1 and 2 of two relatively movable bodies. The isolator has an annular cup-shaped outer metal shell or housing 3 shaped to provide a horizontal upper flange or top cover 4 and a horizontal outwardly projecting mounting flange 5. The latter flange has a series of holes therein which are internally threaded to receive a series of cap screws 6. A thin metal bottom plate 7 is provided having holes to receive the screws 6 and having an upwardly turned annular flange 8 coaxial with the shell 3 and vertically aligned with the hole 9 of the plate 2.

An annular core or supporting member 10 is provided which is in the form of an inverted cup having a radial horizontal flange 11 and an annular bolt-receiving portion 12 projecting downwardly from the center of the cup. The portion 12 is internally threaded to receive a large cap screw 13 which extends downwardly through a hole in the plate 1. A helical spring 14 is provided between the core 10 and the bottom plate 7 to resist downward movement of the core and is centered by the portions 8 and 12. An annular snubbing ring 15 of sponge rubber surrounds the bottom end of the spring and is cemented to the bottom plate 7. The flat horizontal upper surface 16 of the ring 15 is parallel to the flat bottom surface 17 of the flange 4 and perpendicular to the internal cylindrical surface 18 of the shell 3.

A damping ring assembly 20 is provided including upper and lower horizontal damping annuli 21 of sponge rubber and upper and lower flat metal washers 22, said annuli being bonded to the flange 11 and the washers 22. Said assembly also includes a split plastic damping ring 23 which is formed in two sections 24 and 25 and cemented together, a resilient snubbing ring 26 and a thin expansible metal ring or strip 27. The upper section 24 of the ring 23 is split circumferentially and has abutting end edges 29. The lower section 25 is similarly split and has abutting end edges 30 diagonally opposite the edges 29.

The sections 24 and 25 are shaped to fit together so as to form a piston-like member within the shell 3. The upper section 24 has an enlarged annular end portion 31, a groove 32 of rectangular cross-section, and a horizontal annular flange 33 engaging the upper washer 22. The flat horizontal upper surface 34 of the flange 33 normally engages the flat bottom surface 17 of the flange 4, and the smooth external cylindrical surface of the section 24 slidably engages the internal cylindrical surface 18 of the shell 3. The lower section 25 has an enlarged portion 36 of a size to fit in and fill the groove 32, a groove 37 with a rectangular cross-section to receive the portion 31, and a horizontal annular flange 38 engaging the lower washer 22. The flange 38 is of the same size as the flange 33 and has a flat horizontal bottom surface 39 for engaging the snubbing ring 15 as the piston-like member 23 approaches the lower limit of its travel.

The expansible ring 27 is split and when unstressed normally has a radius of curvature greater than the internal diameter of the ring section 25 so that its end edges 40 are spaced apart a substantial distance as shown in Fig. 2; but said end edges are substantially in engagement when the device is assembled as shown in Fig. 1. The snubbing ring 26 has an annular groove 41 of rectangular cross-section that receives the metal ring 27 and holds the ring in position as indicated in Figs. 1 and 3. The expansion of the ring 27 exerts a radial force between the rigid ring 26 and the plastic expansible ring 23 which presses the ring 23 radially outwardly against the cylindrical surface 18 and generates substantial friction when the ring is moved in an axial direction.

Axial force is transmitted from the core 10 to the damping ring 23 through the sponge rubber washers 21 and the metal washers 22. As shown in Figs. 1 and 3 there is an annular space 42 between the flange 11 and the snubbing ring 26 into which the flange 11 may be moved when the core 10 vibrates horizontally. The ring 26 preferably is made of a plastic or other polymeric material which may be deformed to cushion shocks when the flange 11 moves into contact with the ring 26.

If desired, the space 42 may be partially filled with a sponge rubber material to assist in centering the core with respect to the housing 3. However, the spring 14 normally assumes a vertical position and exerts sufficient force to center the core so that such sponge rubber normally would be unnecessary. The flat annular upper surface of the flange 11 is cemented or otherwise bonded to the flat bottom surface of the upper ring 21. The flat annular bottom surface of the flange 11 is similarly bonded to the upper surface of the lower ring 21. The flat bottom surface of the upper washer 22 and the flat upper surface of the lower washer 22 are similarly bonded to the flat surfaces of the rings 21. The inwardly projecting flanges 33 and 38 of the ring 23 have parallel flat horizontal outer surfaces 45 and 46 of the upper and lower rings 22, respectively.

The sponge rubber rings 21 preferably are under slight axial compression so that the flat surface 45 is pressed against the flat bottom surface 43 and the flat surface 46 is pressed against the flat surface 44. The axial pressure provides a substantial friction between the flanges 33 and 38 and the washers 22 which resists horizontal movement of the sponge rubber washers 21. When the horizontal vibration of the core 10 is of a small magnitude, a slight damping force is provided by the rings 21, but there is insufficient force applied to move the washers 22. When the vibration approaches the natural frequency so that the vibration amplitude is considerable, the core 10 may exert sufficient force on the rings 21 to cause the washers 22 to slide horizontally. The friction generated by the sliding movement between the washers 22 and the damping ring 23 provides large damping forces which prevent the horizontal vibration from becoming excessive.

If the amplitude of the vertical vibration is of small magnitude, the sponge rubber rings 21 will permit the vibration of the core 10 without imparting noticeable vertical movement to the damping ring 23. When the natural frequency is approached so as to cause considerable vertical vibration, there will be sufficient force to cause the damping ring 23 to move vertically. At this time the friction generated by the sliding movement between the damping ring 23 and the housing 3 provides large damping forces which limit vibration. If the force exerted on the core 10 is sufficient to move the damping ring 23 substantially to the bottom of the housing 3, the impact is absorbed by engagement of the ring 23 with the flat snubbing ring 15. The plastic flanges 33 and 38 also help to cushion the shock of the ring 23 with the top and bottom ends of the housing 3.

Fig. 3 shows the position of the parts at one instant during a severe vibration. It will be noted that the damping ring 23 is shown in this figure in an intermediate position in which the core 10 is not concentric to the housing 3, the spring 14 being deformed considerably. The horizontal and vertical friction forces provided by the ring 23 prevent magnification of the applied amplitude so that vibration does not become excessive. The vibration isolator of the present invention does not have the undesirable characteristic of transmitting large amounts of force when the vibrations are of small magnitude. The sponge rubber damping annuli 21 do not transmit large forces to the core 10 and the housing 3 except where there is severe vibration. When the applied amplitude is very small, the helical spring 14 normally holds the damping ring 23 in its uppermost position as shown in Fig. 1 and the sponge rubber at 21 does the damping. The spring 14 is constructed preferably so as to have nonlinear deflection characteristics.

The snubbing ring 15 and the damping annuli 21 preferably are made of a soft elastomeric sponge material such as sponge rubber, or an elastomeric plastic sponge material; for example, as disclosed in U.S. Patent No. 2,692,874 and U.S. Patent No. 2,772,245. The material may be a soft elastic polyurethane sponge of the type described in the aforesaid patents or may be a soft elastic sponge made of polyethylene, polyvinyl chloride, or polystyrene. A plasticized polyvinyl chloride sponge would provide excellent results.

The damping ring 23 and the snubbing ring 26 may be made of a rigid plastic material, such as nylon or other material having high impact and shock resistance. The snubbing ring 26 also may be made of an elastic rubber. It is preferable, however, to make the damping ring 23 of a plastic material rather than rubber.

It will be understood that the above description is by way of illustration rather than limitation and that in accordance with the provisions of the patent statutes, variations and modifications of the specific device disclosed herein may be employed without departing from the spirit of the invention.

Having described my invention, I claim:

1. A vibration isolator comprising an internally cylindrical housing having vertical axis, a rigid core having an annular flange projecting radially outwardly relative to said axis, an externally cylindrical piston-like damping ring slidably engaging the internal cylindrical surface of said housing and mounted for vertical movement in said housing, said damping ring having inner marginal flanges directly above and below said first-named flange, means for yieldably positioning said core vertically and horizontally relative to said damping ring including an annular sponge of elastomeric material mounted between said first-named flange and each of the flanges of said damping ring, and spring means applying an upward force to said core and an opposite downward force to said housing and biasing said core upwardly relative to said housing and normally holding said piston-like member at the upper end of said housing.

2. A vibration isolator comprising an internally cylindrical housing having a vertical axis, a rigid core having a horizontal flange projecting radially outwardly relative to said axis, a vertically movable piston-like damping ring of soft deformable polymeric material slidably engaging the vertical internal cylindrical surface of said housing, said damping ring having inwardly extending marginal horizontal flanges directly above and below said first-named flange, a sponge rubber damping means located between said first-named flange and each of the flanges of said damping ring, each of said sponge rubber means having an inner face bonded to said first-named flange and an outer face bonded to the inner face of a flat rigid washer, each washer having a flat horizontal outer face slidably engaging the flat inner faces of said marginal horizontal flanges, and yieldable means for applying an upward force to said core and an opposite downward force to said housing and for holding said piston-like ring at the upper end of said housing.

3. A vibration isolator for interposition between two relatively movable elements comprising a nonmetallic piston-like damping member, a metal housing having an internal cylindrical surface slidably engaging the periphery of said damping member, said damping member being mounted in said housing for axial sliding movement and generating substantial friction during such axial movement, a core member projecting into said housing, means for connecting said core member to one of said elements and for connecting said housing to the other of said elements so that said core member moves relative to said housing and moves relative to said damping member during vibration of said elements, a rigid plate and a piece of soft elastomeric sponge material interposed between said core member and said damping member for yieldably separating said members, said piece having a face bonded to said plate and having an opposing face bonded to one of said members, the other of said members having a flat face generally perpendicular to the axis of said housing and frictionally engaging said rigid plate, said plate having a flat surface slidably engaging the flat face of said other member, one of the engaging flat faces of said plate and said other member being a metallic surface and the other being a nonmetallic surface, and yieldable means for biasing said damping member in a direction toward said core member and toward one end of said housing to separate said elements and for holding said flat faces in frictional engagement, said piece of sponge material damping axial and lateral vibrations of small magnitude without imparting substantial movement to said damping member and said plate, the sliding friction between said damping member and said housing damping axial vibrations of large magnitude, the sliding friction between said flat faces damping lateral vibrations of large magnitude.

4. A vibration isolator as defined in claim 3 wherein said damping member is in the form of an annulus of deformable polymeric plastic material and yieldable means is provided for pressing said annulus radially outwardly against the internal cylindrical surface of said housing to resist axial sliding of said damping member.

5. A vibration isolator as defined in claim 3 wherein said damping member is formed of a deformable polymeric plastic material and said piece of sponge material is bonded to said core member, said plate having a flat metal surface slidably engaging the plastic damping member to damp lateral vibrations.

6. A vibration isolator as defined in claim 1 wherein stop means are provided at each end of said housing to limit vertical movement of said damping ring and wherein a cushion of sponge elastomeric material is provided between said stop means and said damping ring.

7. A vibration isolator as defined in claim 2 wherein an elastomeric snubbing ring is provided between the horizontal flanges of said damping ring concentric to said damping ring and said core and spaced from said core in a radial direction relative to said housing to permit substantial lateral vibration of the core relative to said damping ring.

References Cited in the file of this patent

UNITED STATES PATENTS

| | | |
|---|---|---|
| 2,195,041 | Schlippe | Mar. 26, 1940 |
| 2,520,442 | Schwartz | Aug. 29, 1950 |
| 2,610,017 | Lambert et al. | Sept. 9, 1952 |
| 2,683,016 | Campbell | July 6, 1954 |
| 2,688,479 | Barbera | Sept. 7, 1954 |

FOREIGN PATENTS

| | | |
|---|---|---|
| 772,419 | Great Britain | Apr. 10, 1957 |